Patented Feb. 7, 1950

2,496,576

UNITED STATES PATENT OFFICE 2,496,576

GLYCERIN CONDENSATION

Purdy Bradford, Palos Heights, Ill., assignor to Swift & Company, Chicago, Ill., a corporation of Illinois No Drawing. Application November 23, 1945, Serial No. 630,566

5 Claims. (Cl. 260—417)

The present invention relates to the separation of substantially pure glycerine from a glycerine-containing vapor mixture.

It is an object of the present invention to provide a process for separating glycerine from admixture with water by means of which glycerine, substantially free from water, is obtained.

Another object of the present invention is to provide a process for the partial condensation of glycerine from a glycerine-water vapor mixture by means of which greater economy of operation is realized than with processes heretofore employed.

Another and more specific object of the present invention is to provide a continuous soap making process in which substantially pure glycerine may be separated from its admixture with solvent and water.

It has been long recognized that serious problems are encountered in attempting to separate glycerine from water by fractional distillation or condensation. If ordinary distillation with subsequent condensation is employed, it is impossible to separate any appreciable percentage of glycerine without simultaneously condensing an amount of water which renders the glycerine unfit for sale without complicated and expensive reprocessing.

These problems have been solved to an appreciable extent by adding to the glycerine and water mixture the vapors of a liquid immiscible with both, to form a system from which glycerine may be condensed prior to condensation of the vapors of the added liquid and water. The added liquid which is preferably a hydrocarbon must, of course, have a vapor pressure sufficiently higher than the glycerine so that the major portion of the glycerine may be condensed without condensing at the same time any of the diluent.

The present invention may be used with particular advantage in connection with a soap making process particularly of the continuous type in which glycerine and water are separated from the soap formed upon saponification of the fatty material by means of distillation under conditions of reduced pressure. In this connection a hydrocarbon is employed which will serve as a diluent and solvent for fatty material passing through the system as well as aiding in vapor form the condensation of substantially pure glycerine.

The invention deals more specifically with a process in which there is selected a hydrocarbon diluent having as low a vaopr pressure as possible, commensurate with the partial condensation of glycerine in substantial amounts from a glycerine-hydrocarbon-water vapor mixture, so that the glycerine condensed will be free from both hydrocarbon and water vapor. This results in a maximum economy of operation as the lower the vapor pressure of the diluent, the greater will be the ease of its subsequent condensation and the less the amount of cooling required.

It has been found that in order to condense the greater part of the glycerine vapors without condensing hydrocarbon or water vapors, the solvent used must have a definite minimum vapor pressure depending upon the percentage of the glycerine being condensed and the pressure of the system. Fortunately, however, the latter factor, the pressure of a system, has only a comparatively minor effect and therefore does not present any serious problem in the choice of a solvent.

By way of illustration, the following tabulation is presented which shows the minimum vapor pressure which may be exerted by a hydrocarbon at the condensing temperature of the glycerin vapors so that approximately 95% of the glycerine may be condensed without condensing any of the hydrocarbon. There is also shown the approximate average boiling point at atmospheric pressure which various hydrocarbons could have as maxima and still be applicable.

| Pressure of System mm. Hg | Condensing temperature, °C. | Minimum average vapor pressure of solvent at condensing temperature | Approx. avg. boiling point of solvent at atmospheric pressure, °C. |
|---|---|---|---|
| 5 | 65 | 2.44 | 213 |
| 15 | 80 | 7.3 | 216 |
| 50 | 96 | 24.4 | 199 |

It will be observed from the foregoing data that the minimum average vapor pressure of a solvent in order to be successful in our process should be approximately one half of the pressure of the system at the condensing temperature.

The data in the above table is based on the boiling points of pure hydrocarbons but for most practical purposes mixtures of hydrocarbons having the approximate average boiling point listed are applicable.

As examples of pure hydrocarbons which would be satisfactory for use in accordance with the present invention are listed the following, together with their boiling point at atmospheric pressure, and their vapor pressure at temperatures corresponding to those listed in the table above:

|  | Boiling point at atmospheric pressure | v. p. mm. Hg at— | | |
| --- | --- | --- | --- | --- |
|  |  | 65° C. | 80° C. | 96° C. |
|  | ° C. |  |  |  |
| Decine | 183 | 7.5 | 15 | 34 |
| Undecane | 195 | 6.1 | 14 | 30 |
| Tricyclodecane | 193 | 9.5 | 16 | 35 |
| Decane | 162 | 15 | 32 | 66 |
| Dodecane | 215 | 2.5 | 6 | 14 |

It is to be stressed that while the examples given are pure hydrocarbons, mixtures of hydrocarbons having the same average boiling point will usually be applicable.

In the application of the principles of the invention to a continuous soap making process it can readily be seen that a solvent or diluent for the fatty material will be chosen which will have vapor pressures approaching the minimum desirable.

For example, 115 parts by weight of undecane are mixed with 100 parts by weight of the fatty material which is to be converted into soap so that the fatty material is considerably diluted and rendered much more fluid. This mixture is then mixed with the desired amount of alkali necessary to bring about the saponification of the fatty material. The amount of alkali, for example a solution of caustic soda in water, is preferably only slightly in excess of that theoretically necessary to completely saponify the fat.

After intimate mixing of the diluted fat and hydrocarbon they are projected through a heated coil in which the saponification takes place with the attendant formation of soap and glycerine.

The soap and glycerine together with the water and undecane are then suddenly subjected to greatly diminished pressure by ejecting them through a nozzle into a chamber maintained under vacuum. The products emerge at a high velocity from the constricted orifice of the nozzle with water, hydrocarbon and glycerine in vapor form, and the soap in a molten condition. The soap flows to the bottom of the chamber from which it can be withdrawn while still in a molten condition, and the water-hydrocarbon-glycerine mixture is withdrawn in vapor form and passed to a condenser maintained under conditions of temperature such that approximately 95% of the glycerine is condensed.

The mixture of vapors remaining are then passed to another condenser so that the undecane will be condensed without condensing substantial amounts of water vapor. The condensed hydrocarbon will then preferably be returned to the system and reused as a diluent for fatty material which is being continuously added.

The remaining vapors consisting essentially of those of water may be subsequently condensed in still another condenser and disposed of as desired.

While in the above example the pure hydrocarbon undecane has been specified, it is to be understood that any other hydrocarbon or mixture of hydrocarbons having approximately the same vapor pressure as undecane could also be used. It will be readily understood that by selecting such a hydrocarbon as undecane, which has a selected minimum vapor pressure, the subsequent condensation thereof may be carried out with the maximum efficiency and economy.

Furthermore because of the presence of the hydrocarbon, glycerine is obtained which is free of water to such a degree that it may be disposed of commercially after mere bleaching and possibly deodorization.

The invention is not restricted to the use of hydrocarbons as other organic immiscible liquids may be used, such as the xylols, cyclohexanone, trichlorbenzene, methyl cyclohexanone.

Obviously, many modifications and variations of the invention, as hereinbefore set forth, may be made without departing from the spirit and scope thereof, and therefore only such limitations should be imposed as are indicated in the appended claims.

I claim:

1. In a continuous soap making process the steps comprising: liquefying a saponifiable fat by adding to said fat a hydrocarbon diluent having a vapor pressure approximately that of undecane; adding a water solution of a calculated amount of alkali to said fat and hydrocarbon sufficient to saponify said fat; saponifying said fat by passing said fat, said hydrocarbon and aqueous alkali through a restricted passage at an elevated temperature; ejecting said hydrocarbon, said water and the products of the saponification including soap and glycerine from the restricted passage at high velocity into a region of diminished pressure whereby said glycerine, said water and said hydrocarbon are vaporized, said glycerine, water and hydrocarbon vapor mixture having a vapor pressure approximately twice the vapor pressure of the hydrocarbon at the glycerine condensing temperature; separating said vapors from said soap; condensing glycerine from the vapor system without condensing said hydrocarbon and water; and subsequently separately condensing the hydrocarbon and water.

2. In a continuous soap making process the steps comprising: liquefying a saponifiable fat by adding to said fat a hydrocarbon diluent having a vapor pressure approximately that of undecane; adding a water solution of a calculated amount of alkali to said fat and hydrocarbon sufficient to saponify said fat; saponifying said fat by passing said fat, said hydrocarbon and said alkali through a restricted passage at an elevated temperature; ejecting said hydrocarbon, said water and the products of the saponification including soap and glycerine from the restricted passage at high velocity into a region of diminished pressure whereby said glycerine, said water and said hydrocarbon are vaporized; separating said vapors from said soap; condensing glycerine from the vapor system without condensing said hydrocarbon and water; condensing said hydrocarbon without condensing said water; and returning said hydrocarbon to the system.

3. In a process for recovering glycerine substantially free of water from an impure glycerine-water solution by partial pressure distillation and condensation, the improvement which comprises; forming an intimate liquid mixture of glycerine, water, and a liquid hydrocarbon composition inert toward and immiscible with the liquid glycerine and water; rejecting said liquid mixture at a high velocity into an area maintained at subatmospheric pressure whereby the glycerine, water and hydrocarbon are simultaneously vaporized, said liquid hydrocarbon composition having an average vapor pressure approximately half the vapor pressure of the system at the glycerine condensing temperature; condensing the glycerine from the vapor mixture, whereby substantially all the glycerine and substantially none of the water and hydrocarbon liquid are condensed from the said vapor mixture when the said mixture is subjected to the glycerine condensing temperature; and separately condensing the said liquid hydrocarbon vapors without condensing an appreciable amount of water vapor.

4. In a process for recovering substantially pure glycerine from an aqueous solution thereof by partial pressure distillation and condensation, the improvement which comprises; forming an intimate liquid mixture of the glycerine, water, and a liquid hydrocarbon inert toward and immiscible with the liquid glycerine and water; ejecting said liquid mixture at a high velocity into an area maintained at subatmospheric pressure whereby the glycerine, water and hydrocarbon are simultaneously vaporized, the said hydrocarbon having an average vapor pressure approximately half the vapor pressure of the system at the glycerine condensing temperature; condensing the glycerine from the vapor mixture, whereby substantially all the glycerine and substantially none of the water and hydrocarbon are condensed from the said vapor mixture when the said mixture is subjected to the glycerine condensing temperature; and separately condensing the said liquid hydrocarbon vapors without condensing an appreciable amount of water vapor.

5. In a continuous process for recovering glycerine from an aqueous solution produced by a continuous soap-making process the steps comprising; liquefying a saponifiable fat by adding to said fat a hydrocarbon diluent having a boiling point between approximately 183° C. and 215° C. at atmospheric pressure; adding a water solution of a calculated amount of alkali to said fat and hydrocarbon sufficient to saponify said fat; saponfying said fat by passing the fat, hydrocarbon and aqueous alkali through a restricted passage maintained at an elevated temperature; ejecting the saponified mixture at a high velocity into an area of subatmospheric pressure whereby the glycerine, water and hydrocarbon are simultaneously vaporized; passing the glycerine-hydrocarbon-water vapor mixture into a condenser maintained at a glycerine condensing temperature not over 96° C.; the said vapor pressure of the system being approximately twice the vaporizing pressure of the hydrocarbon; whereby substantially all the glycerine in the vapor mixture is condensed without condensing water and hydrocarbon vapors; and separately condensing the said hydrocarbon vapors without condensing an appreciable amount of water vapor.

PURDY BRADFORD.

REFERENCES CITED

The following references are of record in the file of this patent:

UNITED STATES PATENTS

| Number | Name | Date |
| --- | --- | --- |
| 1,627,040 | Lowrie | May 3, 1927 |
| 1,813,454 | Kokatnur | July 7, 1931 |
| 1,837,010 | Bernhard | Dec. 15, 1931 |
| 2,037,006 | Clayton | Apr. 14, 1936 |
| 2,140,694 | Evans | Dec. 20, 1938 |
| 2,218,234 | Fisher | Oct. 15, 1940 |